US012662113B2

(12) United States Patent　　　　(10) Patent No.:　US 12,662,113 B2

Fadakar et al.　　　　　　　　　　　(45) Date of Patent:　　Jun. 23, 2026

(54) DETERMINATION OF EVASIVE MANEUVER ACTION TO AVOID ONCOMING ROAD HAZARD OF A VEHICLE

(71) Applicant: GM GLOBAL TECHNOLOGY OPERATIONS LLC, Detroit, MI (US)

(72) Inventors: Iman Fadakar, Richmond Hill (CA); Milad Jalaliyazdi, Richmond Hill (CA); Reza Zarringhalam, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 136 days.

(21) Appl. No.: 18/602,386

(22) Filed: Mar. 12, 2024

(65) Prior Publication Data

US 2025/0289417 A1　　Sep. 18, 2025

(51) Int. Cl.
　　*B60W 30/09*　　　　(2012.01)
　　*B60W 30/095*　　　(2012.01)
(52) U.S. Cl.
　　CPC ........ *B60W 30/09* (2013.01); *B60W 30/0956* (2013.01); *B60W 2510/20* (2013.01); *B60W 2520/105* (2013.01); *B60W 2554/802* (2020.02)
(58) Field of Classification Search
　　CPC ............... B60W 30/09; B60W 30/095; B60W 30/0953; B60W 30/0956
　　See application file for complete search history.

(56) References Cited

U.S. PATENT DOCUMENTS

| | | | | |
|---|---|---|---|---|
| 2013/0054128 A1* | 2/2013 | Moshchuk | ......... | B62D 15/0265 701/301 |
| 2014/0032049 A1* | 1/2014 | Moshchuk | ............. | G08G 1/166 701/42 |
| 2015/0151748 A1* | 6/2015 | Benmimoun | ......... | B60W 50/14 701/1 |
| 2015/0232090 A1* | 8/2015 | Jeon | ...................... | B60W 50/14 701/1 |
| 2018/0281857 A1* | 10/2018 | Choi | ...................... | B62D 6/003 |
| 2020/0211394 A1* | 7/2020 | King | .................... | G05D 1/0077 |
| 2022/0289174 A1* | 9/2022 | Hashimoto | ....... | B60W 60/0015 |

FOREIGN PATENT DOCUMENTS

| | | | | |
|---|---|---|---|---|
| DE | 102004062496 A1 | 7/2006 | | |
| DE | 102010006762 A1 | 8/2011 | | |
| DE | 102013224508 A1 | 6/2015 | | |
| EP | 3689696 A1 * | 8/2020 | ............ | B60W 50/14 |

* cited by examiner

*Primary Examiner* — Anshul Sood
(74) *Attorney, Agent, or Firm* — Quinn IP Law

(57) ABSTRACT

Herein, a technology that facilitates a determination of evasive maneuver action to avoid oncoming road hazard of a vehicle is discussed. The technology includes obtaining sensor data about a host vehicle and about an oncoming hazard and obtaining evasive maneuvering (EM) constraints. Using the technology, the vehicle may determine if a vehicle-hazard incident may be avoided. If so, then the vehicle can determine the last point of action (LPA) at which the vehicle may take EM action to avoid the vehicle-hazard incident. At that LPA, the vehicle triggers taking the EM action to avoid the vehicle-hazard incident.

20 Claims, 3 Drawing Sheets

DETERMINATION OF EVASIVE MANEUVER ACTION TO AVOID ONCOMING ROAD HAZARD OF A VEHICLE

INTRODUCTION

Proactive front hazard avoidance technology refers to advanced driver assistance systems (ADASs) that help prevent or mitigate vehicles from incidents involving oncoming road hazards (such as obstacles in the road or other vehicles). Such technology typically includes sensors, processors, and actuation systems that work together to detect potential hazards, warn drivers, and/or act autonomously.

SUMMARY

Disclosed herein is an implementation of a method that facilitates a determination of an evasive maneuver action to avoid an oncoming road hazard of a vehicle. For example, the implementation may include obtaining sensor data regarding a real-time longitudinal velocity of a host vehicle, a relative real-time longitudinal velocity and longitudinal acceleration of an oncoming hazard, a present longitudinal relative distance between the host vehicle and the oncoming hazard, and obtaining evasive maneuvering (EM) constraints of the host vehicle. The implementation may further include determining, based, at least in part, on the obtained sensor data and the obtained EM constraints, that a vehicle-hazard incident may be avoidable by application of EM actions by the host vehicle, wherein the vehicle-hazard incident is physical impact of the host vehicle with the oncoming hazard. In response to the determining that the vehicle-hazard incident may be avoidable, calculating a last point of action (LPA) and determining evasive maneuvering (EM) actions that, when performed by the host vehicle, will avoid the vehicle-hazard incident at the LPA, the LPA being a last moment that the vehicle-hazard incident may be avoided by application of the EM actions by the host vehicle. The implementation may further include tracking, in real time, a time to impact (TTI), and, in response to the TTI matching the calculated LPA, triggering the EM actions by the host vehicle.

Further disclosed is the method in accordance with an implementation, wherein the relative real-time longitudinal velocity of the oncoming hazard is relative to the real-time longitudinal velocity of the host vehicle, and longitudinal acceleration of the oncoming hazard is relative to the real-time longitudinal acceleration of the host vehicle.

Further disclosed is the method in accordance with an implementation, wherein the EM constraints of the host vehicle includes maximum thresholds of longitudinal and transverse acceleration of the host vehicle and minimum evasive-maneuver traverse offset for the host vehicle to maneuver around an oncoming hazard.

Further disclosed is the method in accordance with an implementation, further including: based, at least in part, on the obtained sensor data and the obtained EM constraints, determining that the vehicle-hazard incident may be unavoidable by application of EM actions by the host vehicle; and in response to the determining that the vehicle-hazard incident may be unavoidable, activating incident mitigation to ameliorate a forthcoming physical impact of the host vehicle with the oncoming hazard.

Further disclosed is the method in accordance with an implementation, wherein the determining that the vehicle-hazard incident may be avoidable includes calculating either or both: that the present longitudinal relative distance is sufficient to fully decelerate to zero velocity of the host vehicle given the real-time longitudinal velocity and longitudinal acceleration of the host vehicle and the relative real-time longitudinal velocity and longitudinal acceleration of the oncoming hazard, or that a minimum evasive-maneuver traverse offset of the host vehicle to maneuver around an oncoming hazard, which is part of the obtained EM constraints of the host vehicle, is sufficient for the host vehicle to maneuver around the oncoming hazard given the longitudinal acceleration of the host vehicle and a time to impact the oncoming hazard.

Further disclosed is the method in accordance with an implementation, wherein the EM actions include a calculated amount of steering alone, steering with acceleration, or steering with deceleration to be performed by the host vehicle at the LPA to avoid the vehicle-hazard incident.

Further disclosed is the method in accordance with an implementation, the method further including, in response to the TTI matching the calculated LPA, repeating the obtaining of the sensor data, obtaining of the EM constraints, the determining that the vehicle-hazard incident may be avoidable, and the calculating the LPA and the EM actions.

Further disclosed is the method in accordance with an implementation, in which the method further includes detecting the oncoming hazard prior to obtaining the azard-related sensor data and, in response to detecting the oncoming hazard, initiating the obtaining of the hazar sensor.

Further disclosed is the method in accordance with an implementation, the method further including the host vehicle successfully avoiding a physical impact with the oncoming hazard.

Disclosed herein is an implementation of a method that facilitates a determination of evasive maneuver action to avoid oncoming road hazard of a vehicle. For example, the method includes obtaining sensor data regarding a real-time longitudinal velocity of a host vehicle, relative real-time longitudinal velocity and longitudinal acceleration of an oncoming hazard, and present longitudinal relative distance between the host vehicle and the oncoming hazard and obtaining evasive maneuvering (EM) constraints of the host vehicle. In addition, this implementation includes, based, at least in part, on the obtained sensor data and the obtained EM constraints, determining that a vehicle-hazard incident may be unavoidable by application of EM actions by the host vehicle, and, in response to the determining that the vehicle-hazard incident may be unavoidable, activating incident mitigation to ameliorate a forthcoming physical impact of the host vehicle with the oncoming hazard. In addition, this implementation includes, based, at least in part, on the obtained sensor data and the obtained EM constraints, determining that a vehicle-hazard incident may be avoidable by application of EM actions by the host vehicle, wherein the vehicle-hazard incident is physical impact of the host vehicle with the oncoming hazard and, in response to the determining that the vehicle-hazard incident may be avoidable, calculating a last point of action (LPA) and determining evasive maneuvering (EM) actions that, when performed by the host vehicle, will avoid the vehicle-hazard incident at the LPA, the LPA being a last moment that the vehicle-hazard incident may be avoided by application of the EM actions by the host vehicle. In addition, this implementation includes, in real time, tracking time to impact (TTI), and in response to the TTI matching the calculated LPA, triggering the EM actions by the host vehicle.

Further disclosed is the method in accordance with an implementation, wherein the relative real-time longitudinal velocity of the oncoming hazard is relative to the real-time longitudinal velocity of the host vehicle and longitudinal acceleration of the oncoming hazard is relative to the real-time longitudinal acceleration of the host vehicle.

Further disclosed is the method in accordance with an implementation, wherein the EM constraints of the host vehicle includes maximum thresholds of longitudinal and transverse acceleration of the host vehicle and minimum evasive-maneuver traverse offset for the host vehicle to maneuver around an oncoming hazard.

Further disclosed is the method in accordance with an implementation, wherein the determining that the vehicle-hazard incident may be avoidable includes calculating either or both: that the present longitudinal relative distance is sufficient to fully decelerate to zero velocity of the host vehicle given the real-time longitudinal velocity and longitudinal acceleration of the host vehicle and the relative real-time longitudinal velocity and longitudinal acceleration of the oncoming hazard, or that a minimum evasive-maneuver traverse offset of the host vehicle to maneuver around an oncoming hazard, which is part of the obtained EM constraints of the host vehicle, is sufficient for the host vehicle to maneuver around the oncoming hazard given the longitudinal acceleration of the host vehicle and a time to impact the oncoming hazard.

Further disclosed is the method in accordance with an implementation, wherein the EM actions include a calculated amount of steering alone, steering with acceleration, or steering with deceleration to be performed by the host vehicle at the LPA to avoid the vehicle-hazard incident.

Further disclosed is the method in accordance with an implementation, the method further comprising in response to the TTI matching the calculated LPA, repeating the obtaining of the sensor data, obtaining of the EM constraints, the determining that the vehicle-hazard incident may be avoidable, and the calculating the LPA and the EM actions.

Disclosed herein is an implementation of a host vehicle that includes a non-transitory machine-readable storage medium encoded with instructions executable by one or more processors that, when executed, direct one or more processors to perform operations that facilitates a determination of evasive maneuver action to avoid oncoming road hazard of a vehicle. For example, the processors of the host vehicle may perform operations that include obtaining sensor data regarding a real-time longitudinal velocity of a host vehicle, relative real-time longitudinal velocity and longitudinal acceleration of an oncoming hazard, and present longitudinal relative distance between the host vehicle and the oncoming hazard and obtaining evasive maneuvering (EM) constraints of the host vehicle. In addition, the processors of the host vehicle may perform operations that include, based, at least in part, on the obtained sensor data and the obtained EM constraints, determining that a vehicle-hazard incident may be avoidable by application of EM actions by the host vehicle, wherein the vehicle-hazard incident is physical impact of the host vehicle with the oncoming hazard, and, in response to the determining that the vehicle-hazard incident may be avoidable, calculating a last point of action (LPA) and determining evasive maneuvering (EM) actions that, when performed by the host vehicle, will avoid the vehicle-hazard incident at the LPA, the LPA being a last moment that the vehicle-hazard incident may be avoided by application of the EM actions by the host vehicle. In addition, the processors of the host vehicle may perform operations that include, in real time, tracking time to impact (TTI), and, in response to the TTI matching the calculated LPA, triggering the EM actions by the host vehicle.

Further disclosed is the host vehicle in accordance with an implementation, wherein the relative real-time longitudinal velocity of the oncoming hazard is relative to the real-time longitudinal velocity of the host vehicle and longitudinal acceleration of the oncoming hazard is relative to the real-time longitudinal acceleration of the host vehicle.

Further disclosed is the host vehicle in accordance with an implementation, wherein the EM constraints of the host vehicle includes maximum thresholds of longitudinal and transverse acceleration of the host vehicle and minimum evasive-maneuver traverse offset for the host vehicle to maneuver around an oncoming hazard.

Further disclosed is the host vehicle in accordance with an implementation that further includes operations that, based, at least in part, on the obtained sensor data and the obtained EM constraints, determine that the vehicle-hazard incident may be unavoidable by application of EM actions by the host vehicle and, in response to the determination that the vehicle-hazard incident may be unavoidable, active incident mitigation to ameliorate a forthcoming physical impact of the host vehicle with the oncoming hazard.

Further disclosed is the host vehicle in accordance with an implementation, wherein the determining that the vehicle-hazard incident may be avoidable includes calculating either or both: that the present longitudinal relative distance is sufficient to fully decelerate to zero velocity of the host vehicle given the real-time longitudinal velocity and longitudinal acceleration of the host vehicle and the relative real-time longitudinal velocity and longitudinal acceleration of the oncoming hazard, or that a minimum evasive-maneuver traverse offset of the host vehicle to maneuver around an oncoming hazard, which is part of the obtained EM constraints of the host vehicle, is sufficient for the host vehicle to maneuver around the oncoming hazard given the longitudinal acceleration of the host vehicle and a time to impact the oncoming hazard.

DETAILED DESCRIPTION

Figure 1:
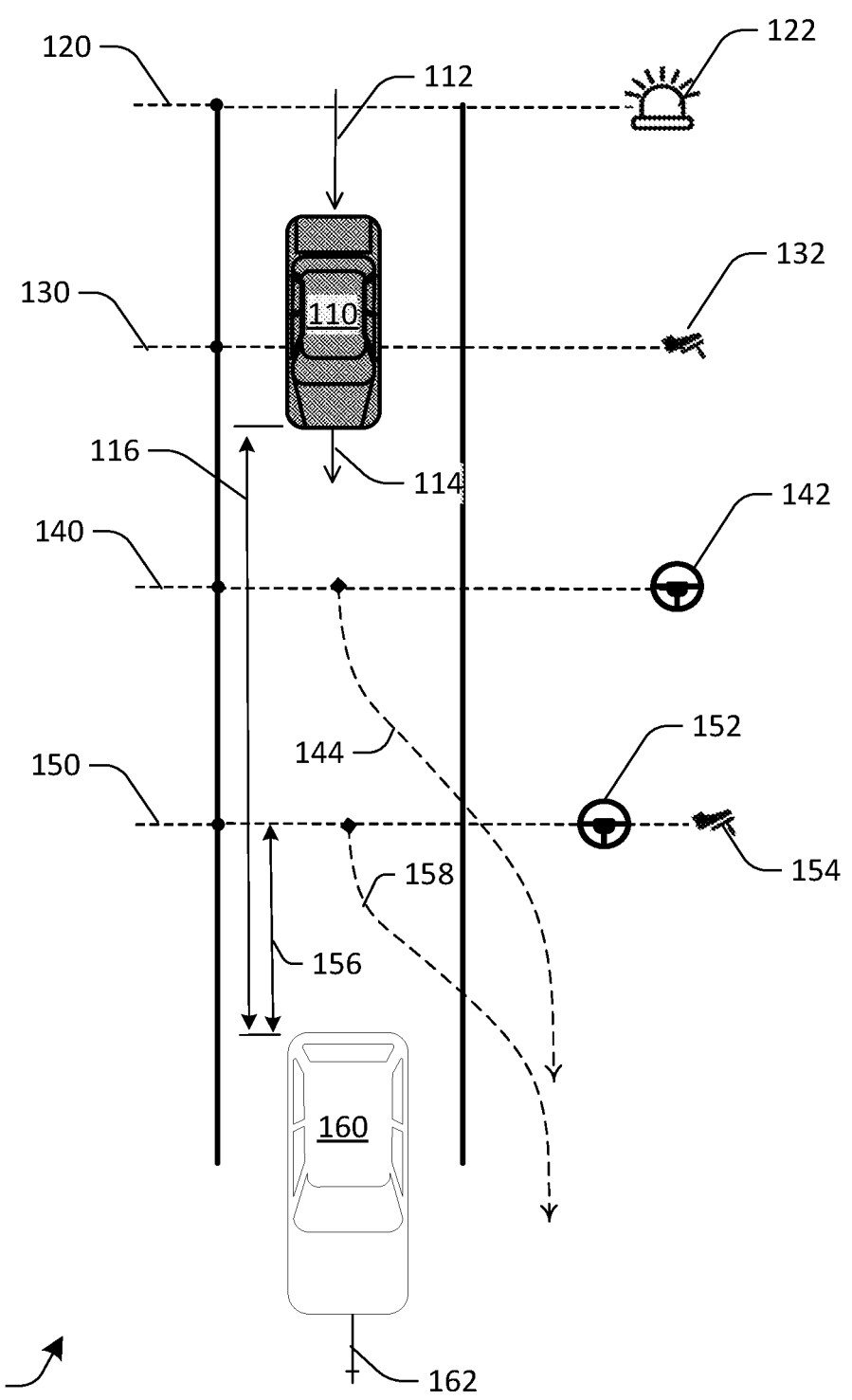
FIG. 1 shows an overview of an example scenario, which illustrates an implementation of the technology described herein.

The technology described herein facilitates a determination of evasive maneuver action to avoid oncoming road hazard of a vehicle. That is, the technology described herein facilitates a determination of whether and/or what evasive maneuver action (e.g., steering, braking, and/or acceleration) that a moving vehicle may take to avoid a road hazard that is in the oncoming path of the moving vehicle.

At high speed or with low road friction, evasive steering is more effective than just braking. Indeed, most often, braking alongside steering leads to a more successful evasive maneuvering (EM) actions than simply one or the other alone. While it may be counterintuitive, in some instances, an acceleration (rather than braking) with steering may be more successful than braking with steering to avoid an impact.

Referring now to the drawings, wherein like numerals indicate like parts in the several views of various systems and approaches are shown and described herein. Disclosed approaches may be suitable for use with automotive vehicles, which include manual, autonomous, and semi-autonomous driving.

FIG. 1 shows an overview of an example scenario 100, which illustrates an implementation of the technology described herein. The example scenario 100 includes a host vehicle 110 avoiding an incident with an oncoming hazard 160 by employing an implementation of the technology described herein.

Proactive front hazard avoidance technology in self-driving and advanced driver assistance systems (ADASs) of the host vehicle 110 may include automated evasive maneuver technology, which enables vehicles to automatically take EM actions to avoid incidents involving oncoming road hazards (such as obstacles in the road or other vehicles). Automated evasive maneuver technology may be fully automated or may be driver-initiated. In a driver-initiated system, the driver starts the maneuver by steering, and the automated evasive maneuver technology engages to assist in completing the maneuver. Automated evasive maneuver technology utilizes sensors like cameras, RADAR (radio detection and ranging), and LIDAR (light detection and ranging) to detect potential hazards and calculate an optimal evasive trajectory in real time.

When an imminent oncoming hazard incident is detected, automated evasive maneuver technology may quickly maneuver the steering wheel to swerve around the obstacle (e.g., the oncoming hazard 160) while maintaining control of the host vehicle 110. Please note that in "steer by wire" systems, the steering wheel may not literally move as much, or at all. Such technology may act as a backup to the driver's actions, taking over steering control when the driver does not take evasive action themselves. This aims to avoid imminent oncoming hazard incidents in situations where the driver doesn't have time to react. Automated motions are intended to be smooth and controlled to avoid more instability or making things worse through abrupt steering motions. Automated evasive maneuver technology is an advancement that could prevent many imminent hazard incidents by taking quick, calculated evasive actions for the driver. Such technology employs sophisticated real-time analysis and control to effectively steer out of harm's way. In addition, such technology helps avoid secondary incidents with other road actors by stabilizing in the adjacent space, rather than veering off the established road or lane of travel.

As depicted, host vehicle 110 is traveling in a forward direction as indicated by arrows 112 and 114. Herein, the axis of that direction is longitudinal, or "x" and the perpendicular direction is called traverse, or "y." Herein, forward or front refers to the direction in which the host vehicle 110 is traveling. Line 116 represents a present longitudinal relative distance ($X_0$) between the vehicle (e.g., host vehicle 110) and the detected hazard (e.g., oncoming hazard 160).

As the host vehicle 110 passes line 120, an onboard sensor detects the oncoming hazard 160 in the forward path of the host vehicle. As indicated by warning light 122, the driver of the host vehicle 110 may be warned accordingly. In addition, other components, and processes of an onboard proactive front hazard avoidance (PFHA) system of the host vehicle may be alerted.

As depicted, the oncoming hazard 160 is a stationary vehicle, as indicated by crossed line 162. However, relative to the host vehicle 110, the oncoming hazard 160 has a relative velocity and is oncoming towards the host vehicle. In other situations, the oncoming hazard 160 may be another vehicle traveling in the same direction as the host vehicle 110. In still other situations, the oncoming hazard 160 may be another vehicle traveling towards the host vehicle 110. In still another situation, the oncoming hazard 160 may be an obstacle (e.g., a boulder) in the roadway.

As the host vehicle 110 travels on its forward path, it passes line 130, which is the last point of braking (LPB). This is indicated by a braking symbol 132. The LPB is the last point in time/space when the host vehicle 110 may effectively brake given road conditions and vehicle constraints and avoid an impact with the oncoming hazard 160. That is, the LPB is the last opportunity for the host vehicle 110 to employ braking alone to avoid an impact with the oncoming hazard 160. Typically, braking of an automobile means using friction mechanisms to actively retard the angular rotation of wheels in order to reduce speed or bring the vehicle to a stop in a stable, controlled manner. The level of braking force determines how quickly the vehicle decelerates.

As the host vehicle 110 travels on its forward path, it passes line 140, which is the last point of steering (LPS). This is indicated by a steering symbol 142. The LPS is the last point in time/space when the host vehicle 110 may effectively steer given road conditions and vehicle constraints and avoid an impact with the oncoming hazard 160. That is, the LPS is the last opportunity for the host vehicle 110 to employ steering alone to avoid an impact with the oncoming hazard 160. Dashed curved line 144 traces out a likely path that the host vehicle 110 might take as it steers alone to avoid an impact with the oncoming hazard 160. Typically, steering refers to the driver or driver-assisted input and underlying mechanisms that enable changing a vehicle's path by orienting the front wheels left or right as needed to reach the desired direction.

As the host vehicle 110 travels on its forward path, it passes line 150, which is the last point of action (LPA). This is indicated by both the steering symbol 152 and the braking symbol 154. Line 156 represents a minimum evasive maneuver traverse offset (w) (i.e., lateral offset) for the host vehicle 110 to maneuver around the oncoming hazard 160. The traverse offset refers to the required amount of lateral (i.e., traverse) movement of the host vehicle that is required to avoid an incident. This depends on the lateral overlap with the front threat plus assurance margins. This offset is an EM constraint and may be the static value stored in memory. In such instances, the minimum evasive-maneuver lateral offset may be a fixed value set by the manufacturer or one of a set of values in a lookup table (e.g., based on variables such as vehicle and road conditions). In other implementations, the minimum evasive-maneuver lateral offset may be calculated based on similar variables.

The LPA is the last point in time/space when the host vehicle 110 may take a combination of evasive action—in a safe manner given known road conditions and vehicle constraints—to avoid an impact with the oncoming hazard 160. Dashed curved line 158 traces out a likely path that the host vehicle 110 might take as it performs EM actions to avoid an impact with the oncoming hazard 160.

The available EM actions are typically a combination of steering with longitudinal acceleration. Herein, longitudinal acceleration may include deceleration (e.g., braking) or acceleration (i.e., increasing speed). Collectively, the available EM actions may be called a "speed profile." The LPA is the last opportunity for the host vehicle 110 to employ an action (e.g., steering combined with acceleration change) to avoid an impact with the oncoming hazard 160.

Figure 2:
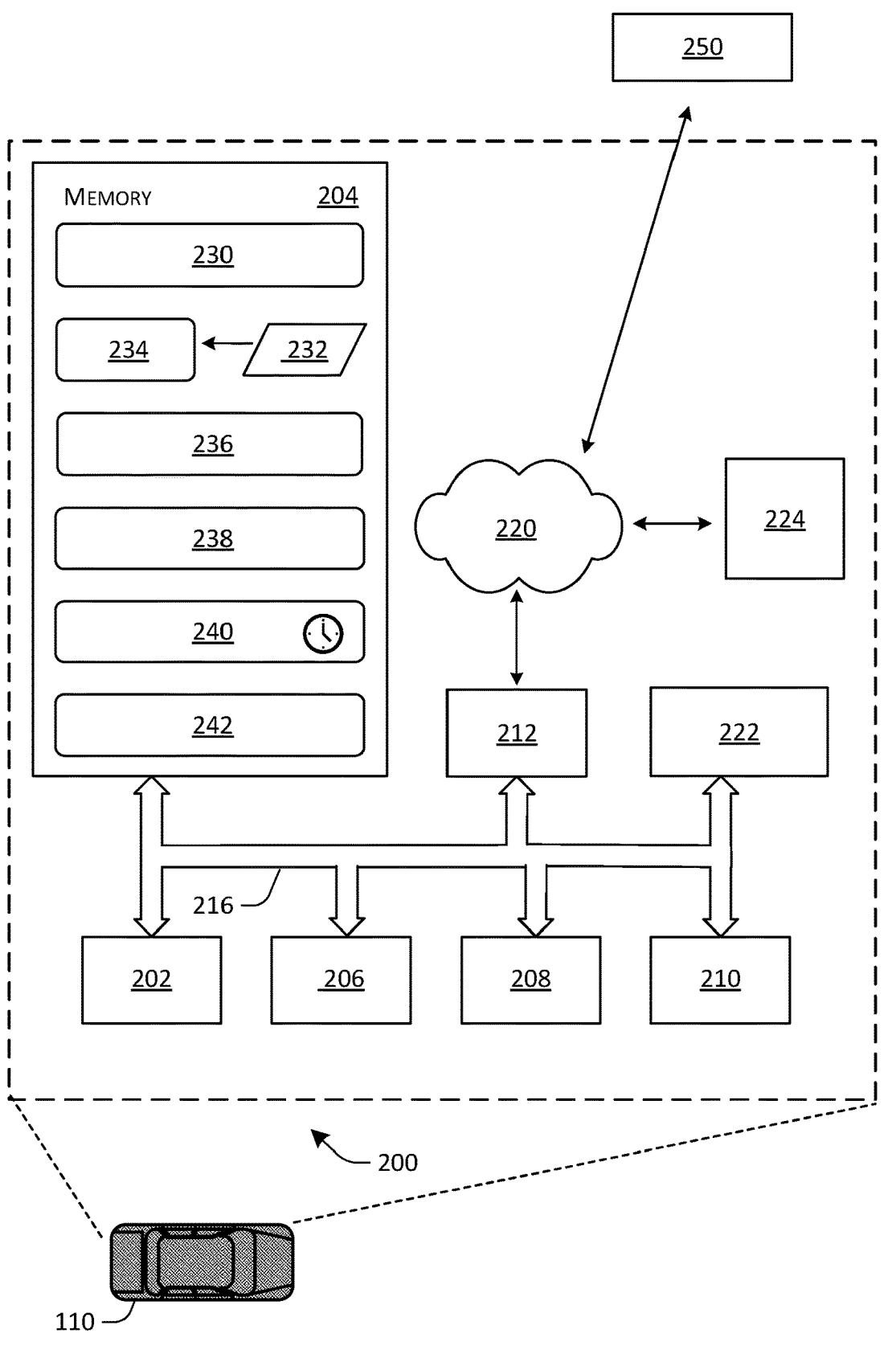
FIG. 2 illustrates an example of computer architecture for a computing system capable of executing the technology described herein.

FIG. 2 illustrates an example of computer architecture for a computing system 200 capable of executing the technology described herein. The computer architecture in this figure illustrates a typical computer, server computer, workstation, desktop computer, laptop, tablet, network appliance, e-reader, smartphone, embedded system, or another computing device. While shown as a single discrete device, the computing system 200 may be part of a distributed and interconnected set of components that accomplish the same functions. The computing system 200 may be part of a proactive front hazard avoidance system of the host vehicle 110.

The computing system 200 includes a processor 202 (e.g., central processor unit or "CPU"), system storage (e.g., memory) 204, input/output (I/O) devices 206—such as a display, a keyboard, a mouse, a microphone, a camera, and associated controllers, a secondary storage system 208 (e.g., a hard drive), and various other subsystems 210. In various embodiments, the computing system 200 also includes a communications ("comm") port 212, operable to connect to a communications ("comm") system 220. Computing system 200 may include or be connected to impact mitigation system 222, which may be part of the proactive front hazard avoidance system. The preceding components may be interconnected via one or more buses 216 and/or comm system 220.

The comm system 220 enables internal communications within computing system 200 and external wireless communications with devices and networks external to the system, such as with an external communication network 250. Internal communication may be, for example, via a local area network. The external wireless communication may include, for example, one or more of the following: satellite communications, WI-FI™, BLUETOOTH™, cellular communications, radio communications, and/or Internet communications.

As part of the internal communications, the comm system 220 may connect one or more sensors 224 to the other components of the computing system 200. One or more of sensors 224 may provide real-time indication of an oncoming road hazard, such as the oncoming hazard 160. One or more other sensors of sensors 224 may provide a present longitudinal relative distance ($X_0$) between the vehicle (e.g., host vehicle 110) and the detected hazard (e.g., oncoming hazard 160).

In addition, one or more of sensors 224 may provide real-time measurements of the longitudinal velocity ($V_h$) of a vehicle, such as host vehicle 110. That is, the sensors provide information about the host vehicle's forward (or backward) speed and acceleration at a given moment.

Furthermore, one or more of sensors 224 may provide a relative real-time longitudinal velocity ($V_T$) and longitudinal acceleration ($a_T$) of an oncoming hazard, and present longitudinal relative distance between the host vehicle and the oncoming hazard. That is, the sensors provide information about the forward (or backward) speed and acceleration of the detected obstacle (e.g., oncoming hazard 160).

System memory 204 may store data and machine-readable instructions (e.g., computer-readable instructions).

Machine-readable instructions may configure the computing system 200. Machine-readable instructions may include one or more instruction modules. The instruction modules may include computer program modules. The instruction modules may include one or more of a hazard detector 230, an EM constraint record 232, an incident-avoidance detector 234, an LPA calculator 236, an EM actions determiner 238, a TTI tracker 240, an EM actions trigger 242, and/or other instruction-based modules.

While the modules in the example depicted by this figure are implemented using machine-readable instructions, other similarly functioning modules may be implemented using little to no machine-readable instructions. Such modules are implemented via hardware (e.g., circuitry) and analog and/or digital signals. In other instances, such modules may be implemented via a combination of hardware and machine-implemented instructions.

One or more sensors 224 and/or the proactive front hazard avoidance system of the host vehicle 110 detects an oncoming road hazard. This information may be conveyed to hazard detector 230. In some implementations, the hazard detector 230 performs the actual detection of the oncoming road hazard. Regardless, the hazard detector 230 initiates determination of EM actions to avoid oncoming road hazard of the host vehicle 110.

In response to initiation by the hazard detector 230, the incident-avoidance detector 234 obtains, from one or more sensors 224, sensor data regarding real-time longitudinal velocity ($V_h$) of a host vehicle 110, relative real-time longitudinal velocity ($V_T$) and longitudinal acceleration ($a_T$) of an oncoming hazard 160, and the present longitudinal relative distance ($X_0$) between the host vehicle and the oncoming hazard.

In addition, the incident-avoidance detector 234 obtains evasive maneuvering (EM) constraints of the host vehicle 110 from the EM constraint record 232. The EM constraints stored in the EM record 232 includes maximum thresholds of longitudinal acceleration ($a_{x,max}$) and transverse acceleration ($a_{y,max}$) of the host vehicle 110 and minimum evasive-maneuver lateral offset (w) for the host vehicle 110 to maneuver around the oncoming hazard 160.

Based, at least in part, on the obtained sensor data and the obtained EM constraints, incident-avoidance detector 234 may determine that the vehicle-hazard incident may be avoidable by application of available EM actions by the host vehicle. This may be accomplished, at least in part, utilizes the following formulas:

$$x(a_\tau, t) - 0.5a_\tau t^2 - v_T t - X_0 = 0 \qquad \text{[Equation 1]}$$

$$y(at, t) = w \qquad \text{[Equation 2]}$$

"$a_\tau$" is "a" sub tau (lower-case Greek letter). This is the longitudinal acceleration of the host vehicle 110. A "t" represents time. These acceleration and time values are constrained by the EM constraints.

If the vehicle-hazard incident is unavoidable, then the incident-avoidance detector 234 signals the impact mitigation system 222 regarding this determination. In one or more implementations, this action activates the impact mitigation system 222 to perform incident mitigation to ameliorate a forthcoming physical impact of the host vehicle with the oncoming hazard. That is, once it is determined that a physical impact is inevitable, then a different system takes action to minimize the potential resulting damage from such impact.

Based, at least in part, on the obtained sensor data and the obtained EM constraints, the incident-avoidance detector 234 determines that a vehicle-hazard incident may be avoidable by the application of EM actions by the host vehicle 110. A vehicle-hazard incident is the physical impact of the host vehicle 110 with the oncoming hazard 160.

In response to the determining that the vehicle-hazard incident may be avoidable, the LPA calculator 236 and EM actions determiner 238 are activated. In one or more implementations, they work together. The LPA calculator 236 calculates the last point of action (LPA) while the EM actions determiner 238 determines which evasive maneuvering actions (e.g., steering and changes in longitudinal acceleration), when performed by the host vehicle, will avoid the vehicle-hazard incident at the LPA. The LPA is the last moment (in space/time) that the vehicle-hazard incident may be avoided by the application of the EM actions (as determined by the EM actions determiner 238) by the host vehicle 110.

To accomplish this, these main optimality condition equations may be performed:

$$\frac{d}{da_\tau}\left[x(a_\tau, t) - 0.5a_T t(a_\tau)^2 - v_T t(a_T)\right] = 0, \; y(a_\tau t) = w \qquad \text{Equation 3}$$

where, using system assurance requirements as indicated the EM constraints, $a_n$ (which is transverse acceleration) is calculated as a function of $a_\tau$ in this manner:

$$a_n: \begin{cases} a_{y,max} & |a_\tau| < a_{x,max} \\ \sqrt{\mu_r^2 g^2 - a_\tau^2} & \text{else} \end{cases}, \; s = \frac{1}{2}a_\tau t^2 + V_h t \qquad \text{Equation 4}$$

where $\mu_r$ is the road's friction coefficient and g is the gravitational constant and s is traveled distance.

Then the LPA can be calculated by replacing t, $a_\tau$ inside the x-coordinate equation of Equation 1 above in the following manner:

$$x(a_{\tau*}, t_*) - 0.5a_T t_*^2 - v_T t_* - X_0 = 0, \qquad \text{Equation 5}$$

$$0.5(a_h - a_T)t_{LPS}^2 + (v_h - v_o)t_{LPS} = X_0$$

In real-time, the TTI tracker 240 tracks time to impact (TTI). The TTI may be the time value of time to impact of an oncoming road hazard. In other implementations, the TTI may be the distance between the host vehicle and the hazard until impact.

In response to the TTI matching the calculated LPA, the EM actions trigger 242 triggers the proactive front hazard avoidance system of the host vehicle 110 to perform the determined EM actions by the host vehicle. In so doing, the host vehicle 110 avoids a physical impact with the oncoming hazard 160. The TTI matches when the present time matches the time value of the time to impact of an oncoming road hazard. In other implementations, the TTI matches when the present distance between the host vehicle and the hazard matches the distance between host vehicle and the hazard until impact. Herein, matching may not mean exact matching. But rather, near matching, such as a few fractions of a second (or a few feet) before literal matching.

Since this triggering waits for TTI that matches the presently calculated LPA, this maximizes the time in which conditions can change and those change of conditions may avoid the physical impact with the oncoming hazard 160. Examples of such conditions include the driver of the host vehicle 110 taking evasive action, the driver of the vehicle of the oncoming hazard 160 taking evasive action, the oncoming hazard 160 may otherwise moving out of the path of the host vehicle, and the like.

Figure 3:
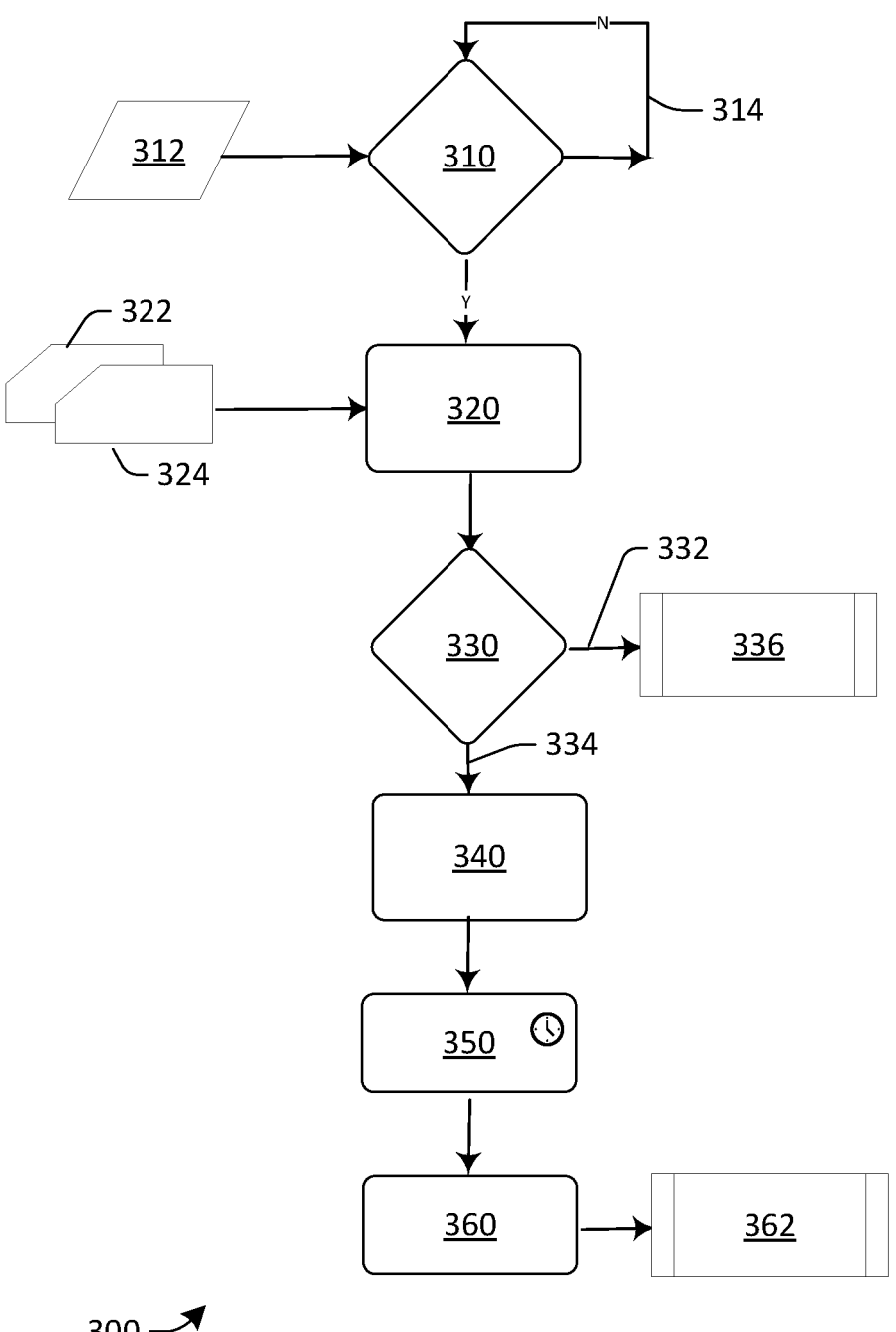
FIG. 3 is a flowchart illustrating a process to perform an example method that facilitates a determination of evasive maneuver action to avoid oncoming road hazard of a vehicle, in accordance with one or more implementations described herein.

FIG. 3 is a flowchart that illustrates process 300 to perform an example method that facilitates a determination of evasive maneuver action to avoid oncoming road hazard of a vehicle. For ease of illustration, process 300 may be described as being performed by a system described herein. Such a system may be, for example, computing system 200 of a vehicle, such as host vehicle 110.

At operation 310, the system receives information 312 from one or more sensors and/or the proactive front hazard avoidance system of a host vehicle (e.g., host vehicle 110) regarding whether an oncoming road hazard (e.g., oncoming hazard 160) has been detected. If no oncoming road hazard is detected, then the operation remains in a state of readiness. This is indicated by loop 314. Otherwise, if the received information 312 indicates that the oncoming road hazard is detected, the process 300 proceeds to operation 320.

At operation 320, the obtains, from the one or more sensors (such as sensors 224), sensor data 322 regarding real-time longitudinal velocity of a host vehicle 110, relative real-time longitudinal velocity and longitudinal acceleration (aT) of an oncoming hazard 160, and the present longitudinal relative distance between the host vehicle and the oncoming hazard.

In addition, at operation 320, the system obtains evasive maneuvering (EM) constraints 324 of the host vehicle from a memory (e.g., EM constraint record 232). The EM constraints may include maximum thresholds of longitudinal and transverse acceleration of the host vehicle 110 and minimum evasive-maneuver lateral offset (e.g., distance) for the host vehicle 110 to maneuver around an oncoming road hazard (such as oncoming hazard 160).

At operation 330, based, at least in part, on the obtained sensor data 322 and the obtained EM constraints 324, the system may determine whether a vehicle-hazard incident may be avoidable by the application of EM actions by the host vehicle. A vehicle-hazard incident is the physical impact of the host vehicle with the oncoming road hazard. As indicated by arrow 332, an unavoidability determination sends process 300 to operation 336. As indicated by arrow 334, an avoidability determination sends process 300 to operation 340.

Operation 336 is performed in response to an unavoidability determination. At operations 336, the system signals an impact mitigation system (such as system 222) regarding this determination. In one or more implementations, this action activates the impact mitigation system to perform incident mitigation to ameliorate a forthcoming physical impact of the host vehicle with the oncoming hazard. That is, once it is determined that a physical impact is inevitable, then a different system takes action to minimize the potential resulting damage from such impact. Process 300 ends with operation 336. Alternatively, after operation 336, process 300 restarts at operation 310.

Operation 340 is performed in response to an avoidability determination. At operation 340, the system calculates LPA and determines EM actions that may be taken to avoid the forthcoming vehicle-hazard incident. The calculated LPA is the last point of action in which EM actions may be performed to avoid the forthcoming vehicle-hazard incident. The determined EM actions are the evasive maneuvering actions (e.g., steering and changes in longitudinal acceleration) that, when performed by the host vehicle, will avoid the vehicle-hazard incident at the LPA. The LPA being the last moment (in space/time) that the vehicle-hazard incident may be avoided by application of the determined EM actions by the host vehicle.

At operation 350, in real time, the system tracks a time to impact (TTI).

At operation 360, in response to the TTI matching the calculated LPA, the system triggers a proactive front hazard avoidance system 362 of the host vehicle to perform the determined EM actions (e.g., steering and changes in longitudinal acceleration). In so doing, the host vehicle avoids a physical impact with the oncoming road hazard.

Since this triggering waits for TTI that matches the presently calculated LPA, this maximizes the time in which conditions can change and those change of conditions may avoid the physical impact with the oncoming road hazard. Examples of such conditions include the driver of the host vehicle 110 take evasive action, the driver of the vehicle of the oncoming hazard 160 may take evasive action, the oncoming hazard 160 may otherwise move out of the path of the host vehicle, and the like.

The above description is intended to be illustrative and not restrictive. While the dimensions and types of materials described herein are intended to be illustrative, they are by no means limiting and are exemplary embodiments. In the following claims, use of the terms "first," "second", "top", "bottom", etc. are used merely as labels and are not intended to impose numerical or positional requirements on their objects. As used herein, an element or step recited in the singular and preceded by the word "a" or "an" should be understood as not excluding the plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51% to 99% out of a possible extent of 100%", and do not necessarily mean "perfectly", "completely", "strictly", "entirely" or "100%". Additionally, the word "proximate" may be used herein to describe the location of an object or portion thereof concerning another object or portion thereof, and/or to describe the positional relationship of two objects or their respective portions thereof concerning each other, and may mean "near", "adjacent", "close to", "close by", "at" or the like. And, the phrase "approximately equal to" as used herein may mean one or more of "exactly equal to", "nearly equal to", "equal to somewhere between 90% and 110% of" or the like.

This written description uses examples, including the best mode, to enable those skilled in the art to make and use devices, systems, and compositions of matter, and to perform methods, according to this disclosure. It is the following claims, including equivalents, which define the scope of the present disclosure.

What is claimed is:

1. A method of executing evasive maneuvering actions to avoid an oncoming hazard of a host vehicle, the method comprising:

obtaining host sensor data indicating a real-time longitudinal velocity of the host vehicle;

obtaining hazard sensor data indicating a relative real-time longitudinal velocity ($v_T$) of the oncoming hazard, a relative real-time longitudinal acceleration ($a_T$) of the oncoming hazard, and a present longitudinal relative distance ($X_0$) between the host vehicle and the oncoming hazard;

obtaining evasive maneuvering (EM) constraints of the host vehicle, the EM constraints including a minimum evasive-maneuver lateral offset (w) of the host vehicle;

determining, based, at least in part, on the obtained host and hazard sensor data and the obtained EM constraints, a vehicle-hazard incident is avoidable by application of one or more of the EM actions by the host vehicle, wherein the vehicle-hazard incident is physical impact of the host vehicle with the oncoming hazard, and wherein determining the vehicle-hazard incident is avoidable includes calculating a host vehicle acceleration ($a_r$) and a time value (t) constrained by the EM constraints as: (1) $x(a_r,t)-0.5a_T t^2-v_T t^2-X_0=0$; and (2) $y(a_r,t)=w$;

determining, in response to determining the vehicle-hazard incident is avoidable, a last point of action (LPA) and the one or more EM actions that, when performed by the host vehicle, will avoid the vehicle-hazard incident at the LPA, the LPA being a last moment that the vehicle-hazard incident may be avoided by application of the one or more EM actions by the host vehicle;

tracking, in real time, a time to impact (TTI) between the host vehicle and the oncoming hazard; and triggering, in response to the TTI matching the calculated LPA, the one or more EM actions by the host vehicle.

2. The method of claim 1, wherein the relative real-time longitudinal velocity of the oncoming hazard is relative to the real-time longitudinal velocity of the host vehicle, and the relative real-time longitudinal acceleration of the oncoming hazard is relative to a real-time longitudinal acceleration of the host vehicle.

3. The method of claim 1, wherein the EM constraints of the host vehicle further include maximum thresholds of longitudinal and transverse acceleration of the host vehicle, and wherein the minimum evasive-maneuver lateral offset is for the host vehicle to maneuver around oncoming hazards.

4. The method of claim 1, further comprising:

determining, based, at least in part, on the obtained host and hazard sensor data and the obtained EM constraints, the vehicle-hazard incident is unavoidable by application of the one or more EM actions by the host vehicle; and activating, in response to determining the vehicle-hazard incident is unavoidable, incident mitigation actions by the host vehicle to ameliorate a forthcoming physical impact of the host vehicle with the oncoming hazard.

5. The method of claim 1, wherein determining the vehicle-hazard incident is avoidable includes calculating:

that the present longitudinal relative distance is sufficient to fully decelerate to zero the real-time longitudinal velocity of the host vehicle given the real-time longitudinal velocity and a real-time longitudinal acceleration of the host vehicle and the relative real-time longitudinal velocity and the relative real-time longitudinal acceleration of the oncoming hazard, and/or that the minimum evasive-maneuver lateral offset of the host vehicle to maneuver around oncoming hazards, which is part of the obtained EM constraints of the host vehicle, is sufficient for the host vehicle to maneuver around the oncoming hazard given the real-time longitudinal acceleration of the host vehicle and the time to impact of the host vehicle with the oncoming hazard.

6. The method of claim 1, wherein the EM actions include a calculated amount of steering alone, a calculated amount of steering with acceleration, and/or a calculated amount of steering with deceleration to be performed by the host vehicle at the LPA to avoid the vehicle-hazard incident.

7. The method of claim 1, further comprising, in response to the TTI matching the calculated LPA, repeating the obtaining of the host and hazard sensor data, the obtaining of the EM constraints, the determining that the vehicle-hazard incident is avoidable, and the determining the LPA and the one or more EM actions.

8. The method of claim 1, further comprising:
    detecting the oncoming hazard prior to obtaining the hazard sensor data; and
    in response to detecting the oncoming hazard, initiating the obtaining of the hazard sensor data.

9. The method of claim 1, further comprising confirming the host vehicle successfully avoiding a physical impact with the oncoming hazard.

10. A method of operating a host vehicle, the method comprising:
    obtaining host sensor data indicating a real-time longitudinal velocity of the host vehicle;
    obtaining hazard sensor data indicating a relative real-time longitudinal velocity ($v_T$) of an oncoming hazard, a relative real-time longitudinal acceleration ($a_T$) of the oncoming hazard, and a present longitudinal relative distance ($X_0$) between the host vehicle and the oncoming hazard;
    obtaining evasive maneuvering (EM) constraints of the host vehicle, the EM constraints including a minimum evasive-maneuver lateral offset (w) of the host vehicle;
    determining, based, at least in part, on the obtained host and hazard sensor data and the obtained EM constraints, a vehicle-hazard incident is unavoidable by application of one or more EM actions by the host vehicle;
    activating, in response to determining the vehicle-hazard incident is unavoidable, one or more incident mitigation actions by the host vehicle to ameliorate a forthcoming physical impact of the host vehicle with the oncoming hazard;
    determining, based, at least in part, on the obtained host and hazard sensor data and the obtained EM constraints, the vehicle-hazard incident is avoidable by application of the one or more EM actions by the host vehicle, wherein the vehicle-hazard incident is physical impact of the host vehicle with the oncoming hazard, and wherein determining the vehicle-hazard incident is avoidable includes calculating a host vehicle acceleration ($a_r$) and a time value (t) constrained by the EM constraints as: (1) $x(a_r,t)-0.5a_T t^2-v_T t-X_0=0$; and (2) $y(a_r,t)=w$;
    determining, in response to determining the vehicle-hazard incident is avoidable, calculating a last point of action (LPA) and the one or more EM actions that, when performed by the host vehicle, will avoid the vehicle-hazard incident at the LPA, the LPA being a last moment that the vehicle-hazard incident may be avoided by application of the EM actions by the host vehicle;
    tracking, in real time, a time to impact (TTI) between the host vehicle and the oncoming hazard; and
    triggering, in response to the TTI matching the calculated LPA, the one or more EM actions by the host vehicle.

11. The method of claim 10, wherein the relative real-time longitudinal velocity of the oncoming hazard is relative to the real-time longitudinal velocity of the host vehicle, and the relative real-time longitudinal acceleration of the oncoming hazard is relative to a real-time longitudinal acceleration of the host vehicle.

12. The method of claim 10, wherein the EM constraints of the host vehicle further include maximum thresholds of longitudinal and transverse acceleration of the host vehicle, and wherein the minimum evasive-maneuver lateral offset is for the host vehicle to maneuver around oncoming hazards.

13. The method of claim 10, wherein determining the vehicle-hazard incident is avoidable includes calculating:
    that the present longitudinal relative distance is sufficient to fully decelerate to zero the real-time longitudinal velocity of the host vehicle given the real-time longitudinal velocity and a real-time longitudinal acceleration of the host vehicle and the relative real-time longitudinal velocity and the relative real-time longitudinal acceleration of the oncoming hazard, and/or
    that the minimum evasive-maneuver lateral offset of the host vehicle to maneuver around oncoming hazards, which is part of the obtained EM constraints of the host vehicle, is sufficient for the host vehicle to maneuver around the oncoming hazard given the real-time longitudinal acceleration of the host vehicle and the time to impact with the oncoming hazard.

14. The method of claim 10, wherein the EM actions include a calculated amount of steering alone, a calculated amount of steering with acceleration, and/or a calculated amount of steering with deceleration to be performed by the host vehicle at the LPA to avoid the vehicle-hazard incident.

15. The method of claim 10, further comprising, in response to the TTI matching the calculated LPA, repeating the obtaining of the host and hazard sensor data, the obtaining of the EM constraints, the determining that the vehicle-hazard incident is avoidable, and the determining the LPA and the one or more EM actions.

16. A host vehicle that includes a non-transitory machine-readable storage medium encoded with instructions executable by one or more processors that, when executed, direct one or more processors to perform operations that facilitate evasive maneuvering actions to avoid an oncoming hazard of a host vehicle, the operations comprising:
    obtaining sensor data indicating a real-time longitudinal velocity of the host vehicle, a relative real-time longitudinal velocity (vr) of the oncoming hazard, a relative real-time longitudinal acceleration ($a_T$) of the oncoming hazard, and a present longitudinal relative distance ($X_0$) between the host vehicle and the oncoming hazard;
    obtaining evasive maneuvering (EM) constraints of the host vehicle, the EM constraints including a minimum evasive-maneuver lateral offset (w) of the host vehicle;
    based, at least in part, on the obtained sensor data and the obtained EM constraints, determining a vehicle-hazard incident is avoidable by application of one or more of the EM actions by the host vehicle, wherein the vehicle-hazard incident is physical impact of the host vehicle with the oncoming hazard, and wherein determining the vehicle-hazard incident is avoidable includes calculating a host vehicle acceleration ($a_\tau$) and a time value (t) constrained by the EM constraints as: (1) $x(a_\tau,t)-0.5a_\tau t^2-v_\tau t-X_0=0$; and (2) $y(a_\tau,t)=w$;

in response to determining the vehicle-hazard incident is avoidable, calculating a last point of action (LPA) and determining the one or more EM actions that, when performed by the host vehicle, will avoid the vehicle-hazard incident at the LPA, the LPA being a last moment that the vehicle-hazard incident may be avoided by application of the EM actions by the host vehicle;

in real time, tracking a time to impact (TTI) between the host vehicle and the oncoming hazard; and in response to the TTI matching the calculated LPA, triggering the one or more EM actions by the host vehicle.

17. The host vehicle with a non-transitory machine-readable storage medium of claim 16, wherein the relative real-time longitudinal velocity of the oncoming hazard is relative to the real-time longitudinal velocity of the host vehicle, and the relative real-time longitudinal acceleration of the oncoming hazard is relative to a real-time longitudinal acceleration of the host vehicle.

18. The host vehicle with a non-transitory machine-readable storage medium of claim 16, wherein the EM constraints of the host vehicle further include maximum thresholds of longitudinal and transverse acceleration of the host vehicle, and wherein the minimum evasive-maneuver lateral offset is for the host vehicle to maneuver around oncoming hazards.

19. The host vehicle with a non-transitory machine-readable storage medium of claim 16, the operations further comprising:

based, at least in part, on the obtained sensor data and the obtained EM constraints, determining the vehicle-hazard incident is unavoidable by application of the one or more EM actions by the host vehicle;

in response to determining the vehicle-hazard incident is unavoidable, activating incident mitigation actions by the host vehicle to ameliorate a forthcoming physical impact of the host vehicle with the oncoming hazard.

20. The host vehicle with a non-transitory machine-readable storage medium of claim 16, wherein determining the vehicle-hazard incident is avoidable includes calculating:

that the present longitudinal relative distance is sufficient to fully decelerate to zero the real-time longitudinal velocity of the host vehicle given the real-time longitudinal velocity and a real-time longitudinal acceleration of the host vehicle and the relative real-time longitudinal velocity and the relative real-time longitudinal acceleration of the oncoming hazard, and/or that the minimum evasive-maneuver lateral offset of the host vehicle to maneuver around oncoming hazards, which is part of the obtained EM constraints of the host vehicle, is sufficient for the host vehicle to maneuver around the oncoming hazard given the real-time longitudinal acceleration of the host vehicle and the time to impact of the host vehicle with the oncoming hazard.

\* \* \* \* \*